(12) United States Patent
Wang

(10) Patent No.: US 11,375,379 B1
(45) Date of Patent: Jun. 28, 2022

(54) METHOD AND APPARATUS FOR IDENTIFYING TERMINALS

(71) Applicant: BEIJING XIAOMI MOBILE SOFTWARE CO., LTD., Beijing (CN)

(72) Inventor: Xiang Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/683,348

(22) Filed: Feb. 28, 2022

(30) Foreign Application Priority Data

Oct. 8, 2021 (CN) .......................... 202111169676.X

(51) Int. Cl.
| | | |
|---|---|---|
| *H04W 12/06* | (2021.01) | |
| *H04W 12/63* | (2021.01) | |
| *H04W 12/71* | (2021.01) | |
| *H04W 12/47* | (2021.01) | |
| *G06Q 20/40* | (2012.01) | |
| *H04W 12/00* | (2021.01) | |

(52) U.S. Cl.
CPC ........ *H04W 12/47* (2021.01); *G06Q 20/4015* (2020.05); *H04W 12/009* (2019.01); *H04W 12/06* (2013.01); *H04W 12/63* (2021.01); *H04W 12/71* (2021.01)

(58) Field of Classification Search
None
See application file for complete search history.

(56) References Cited

U.S. PATENT DOCUMENTS

| | | | | |
|---|---|---|---|---|
| 2015/0302409 | A1* | 10/2015 | Malek ................ | G06Q 20/3224 705/44 |
| 2020/0089861 | A1* | 3/2020 | Stryker ................. | B65D 75/54 |
| 2021/0142337 | A1* | 5/2021 | Guinard ............ | G06Q 30/0185 |

FOREIGN PATENT DOCUMENTS

| | | |
|---|---|---|
| CN | 102855574 A | 1/2013 |
| CN | 102984689 A | 3/2013 |
| CN | 104754568 A | 7/2015 |
| CN | 109461005 A | 3/2019 |

OTHER PUBLICATIONS

First Office Action of the Chinese application No. 202111169676.X, dated Nov. 18, 2021 with English translation,(10p).

\* cited by examiner

*Primary Examiner* — Nelson S. Giddins
(74) *Attorney, Agent, or Firm* — Arch & Lake LLP

(57) ABSTRACT

A method and an apparatus for identifying terminals. The method includes: sending by an NFC card reader of the identifying terminal, a preset instruction to an NFC chip of a terminal to be identified packaged in a packaging box, to switch on the terminal to be identified in a compartment; obtaining identification information corresponding to the terminal to be identified; obtaining location information of the identifying terminal; transmitting the location information and the identification information of the terminal to be identified to a verification server; and obtaining and outputting the identification result sent by the verification server.

16 Claims, 5 Drawing Sheets

FIG. 1

METHOD AND APPARATUS FOR IDENTIFYING TERMINALS

CROSS-REFERENCE TO RELATED APPLICATIONS

This application is based upon and claims priority to Chinese Patent Application No. 202111169676.X filed on 8 Oct. 2021, the entire content of which is incorporated herein by reference for all purposes.

TECHNICAL FIELD

The disclosure relates to the field of terminal identification technology, in particular to a method and an apparatus for identifying terminals, and a storage medium.

BACKGROUND

The sale of parallel import terminals will disrupt the normal market order and cannot enjoy the normal warranty policy. Therefore, before purchasing a terminal, it is usually necessary to verify whether the purchased terminal is a parallel import terminal.

SUMMARY

A first aspect of the disclosure provides a method for identifying terminals. The method is applied to an identifying terminal, and includes: sending by an NFC card reader of the identifying terminal, a preset instruction to an NFC chip of a terminal to be identified packaged in a packaging box, wherein the preset instruction is configured to enable the NFC chip to pull up a power-on level, to switch on the terminal to be identified in a compartment; obtaining identification information corresponding to the terminal to be identified, wherein the identification information at least includes an International Mobile Equipment Identity (IMEI) number of the terminal to be identified and information uniquely indicating the terminal to be identified; obtaining location information of the identifying terminal; transmitting the location information and the identification information of the terminal to be identified to a verification server, so that the verification server query legal sales places of the terminal to be identified based on the identification information of the terminal to be identified, and generate an identification result by comparing the location information with the legal sales places of the terminal to be identified; obtaining and outputting the identification result sent by the verification server.

A second aspect of the disclosure provides a method for identifying terminals. The method is applied to a verification server and includes: receiving identification information of a terminal to be identified and location information of an identifying terminal sent by the identifying terminal, wherein the identification information comprises at least an IMEI number of the terminal to be identified and information uniquely indicating the terminal to be identified; querying legal sales places of the terminal to be identified based on the identification information of the terminal to be identified; generating an identification result by comparing the location information with the legal sales places of the terminal to be identified; sending the identification result to the identifying terminal.

A third aspect of the present disclosure provide an identifying terminal. The identifying terminal includes a processor and a memory. The memory is configured to store instructions executable by the processor. The processor is configured to implement the method in the first aspect by executing the instructions stored in the memory.

Additional aspects and advantages of the present disclosure will be set forth, in part, from the following description, and in part will be apparent from the following description, or may be learned by practice of the present disclosure.

BRIEF DESCRIPTION OF THE DRAWINGS

The above and/or additional aspects and advantages of the present disclosure will become apparent and readily understood from the following description of embodiments taken in conjunction with the accompanying drawings, wherein.

DETAILED DESCRIPTION

Figure 1:
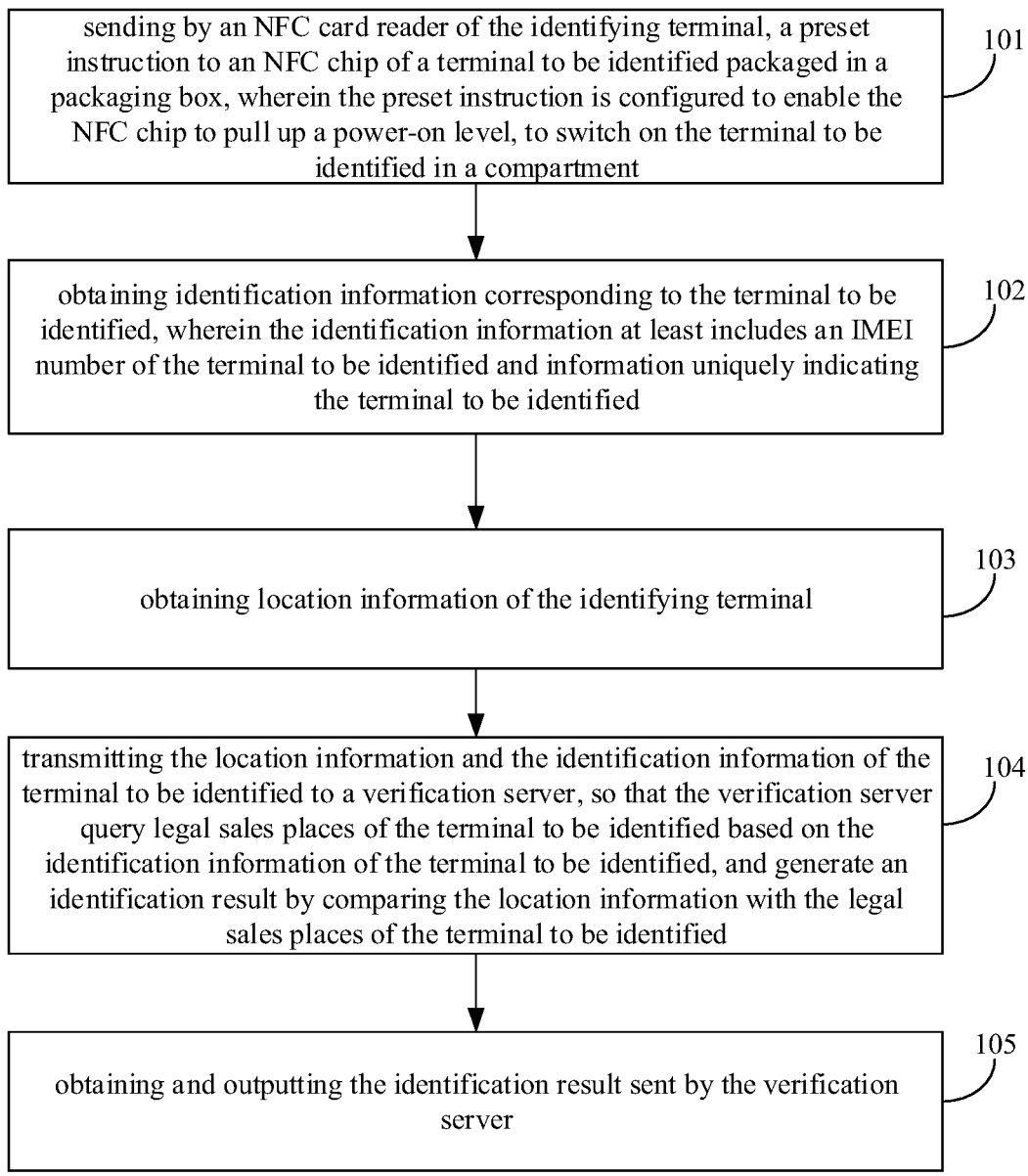
FIG. 1 is a flowchart of a method for identifying terminals provided according to one or more examples of the present disclosure.

Embodiments of the present disclosure are described in detail below, examples of which are illustrated in the accompanying drawings, wherein the same or similar reference numerals refer to the same or similar elements or elements having the same or similar functions throughout. The embodiments described below with reference to the accompanying drawings are exemplary, and are intended to explain the present disclosure and should not be construed as a limitation of the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In the method and apparatus for identifying terminals and storage medium proposed in the present disclosure, an NFC card reader of an identifying terminal is used to send a preset instruction to an NFC chip of a terminal to be identified packaged in a packaging box, so as to make the NFC chip pull up the power-on level, to switch on the terminal to be identified in a compartment. Then, identification information corresponding to the terminal to be identified is obtained. This information at least includes an IMEI number of the terminal to be identified and information that uniquely indicates the terminal to be identified. Then location information of the identifying terminal is obtained, and the location information and the identification information of the terminal to be identified are transmitted to a verification server, so that the verification server can query the legal sales places of the terminal to be identified based on the identification information of the terminal to be identified, and generate an identification result by comparing the location information with the legal sales places of the terminal to be identified. Finally, the identification result sent by the verification server is obtained and output.

It can be seen that, in embodiments of the present disclosure, the user can obtain the IMEI number of the terminal to be identified without removing the box, and identify whether the terminal is compliant based on the IMEI number, avoiding the occurrence of "having to purchase after unpacking even if the terminal is noncompliant", improving the user's purchasing experience and protecting the operation of the compliant terminal market.

In addition, the IMEI number obtained in embodiments of the present disclosure is sent by the terminal to be identified to the identifying terminal, that is, the IMEI number is stored in the terminal to be identified, so it is not easy to be tampered with, so that the problem of inaccurate identification caused by tampering with the IMEI number can be avoided.

In addition, in embodiments of the present disclosure, when verifying the terminal to be identified, verification is also performed based on the location information of the identifying terminal, so that the identification accuracy can be further improved.

The method and apparatus for identifying terminals according to embodiments of the present disclosure are described below with reference to drawings.

Embodiment 1

FIG. 1 is a flowchart of a method for identifying terminals provided according to an embodiment of the present disclosure. The method is applied to an identifying terminal, and as illustrated in FIG. 1, the method for identifying terminals includes followings.

In step 101, a preset instruction is sent by an NFC card reader of the identifying terminal to an NFC chip of a terminal to be identified packaged in a packaging box. The preset instruction is configured to enable the NFC chip to pull up a power-on level, to switch on the terminal to be identified in a compartment.

In detail, in embodiments of the present disclosure, the NFC function of the identifying terminal can be enabled, and the identifying terminal can be made close to the terminal to be identified (for example, the distance between the identifying terminal and the terminal to be identified is less than a first threshold), Thereby, the preset instruction is sent to the NFC chip in the terminal to be identified packaged in the packaging box by using the NFC card reader.

In step 102, identification information corresponding to the terminal to be identified is obtained. The identification information includes at least an International Mobile Equipment Identity (IMEI) number of the terminal to be identified and information uniquely indicating the terminal to be identified.

The information uniquely indicating the terminal to be identified provided in the present disclosure may include at least one of the followings:

a MAC address of a WIFI module of the terminal to be identified;

a MAC address of a Bluetooth module of the terminal to be identified.

In embodiments of the present disclosure, after the identifying terminal controls the terminal box to be identified to be turned on in a compartment, the identifying terminal can communicate with the terminal to be identified in a preset manner, so as to obtain the identification information corresponding to the terminal to be identified.

The preset manner may include at least one of the following:

NFC communication;
Bluetooth communication; and
WIFI communication.

Further, in embodiments of the present disclosure, the method for obtaining the identification information corresponding to the terminal to be identified may mainly include:

first obtaining a power of the terminal to be identified, and determining whether the power meets a preset power; in response to the power meeting the preset power, performing the step of obtaining the identification information corresponding to the terminal to be identified; in response to the power not meeting the preset power, outputting a prompt of insufficient power, which ensures that the subsequent identification process is performed on the premise of sufficient power, and ensures the stability of the identification process.

In step 103, location information of the identifying terminal is obtained.

In embodiments of the present disclosure, the identifying terminal may obtain its own location information based on GPS (Global Positioning System) technology, or obtain current location information according to information such as time zone, WiFi, base station, etc. The location information may only be city information.

In step 104, the location information and the identification information of the terminal to be identified are transmitted to a verification server, so that the verification server query legal sales places of the terminal to be identified based on the identification information of the terminal to be identified, and generate an identification result by comparing the location information with the legal sales places of the terminal to be identified.

When the identifying terminal sends the location information and the identification information of the terminal to be identified to the terminal to be identified, it can first encrypt the location information and the identification information of the terminal to be identified, and then transmit the encrypted location information and identification information of the terminal to be identified to the verification server, to ensure the security of information transmission.

Further, it should be noted that, in this embodiment, the verification server generates the identification result by comparing the location information with the legal sales places of the terminal to be identified as follows.

Step 1, Query the correct MAC address of the WIFI module and/or the correct MAC address of the Bluetooth module corresponding to the terminal to be identified according to the IMEI number of the terminal to be identified.

Step 2, Determine whether the correct MAC address of the WIFI module is consistent with the MAC address of the WIFI module in the identification information reported by the identifying terminal, and/or determine whether the correct MAC address of the Bluetooth module is consistent with the MAC address of the Bluetooth module in the identification information reported by the identifying terminal. When they are both consistent, it is determined that the identification result of the terminal to be identified is a genuine terminal, and step 3 is performed; otherwise, the identification result of the terminal to be identified is a non-genuine terminal, and the identification result is sent to the identifying terminal.

Step 3, Obtain the number of historical verifications of the terminal to be identified, determine whether the number of historical verifications exceeds the threshold, and when the threshold is exceeded, determine that the identification result of the terminal to be identified is a non-genuine terminal, and send the identification result to the identifying terminal. When the threshold is not exceeded, proceed to step 4.

In this step 3, the number of historical verifications of the terminal to be identified may be obtained by determining the number of historical queries of the IMEI number of the terminal to be identified. The threshold value may be 1, for example.

Step 4, Obtain the legal sales places of the terminal to be identified.

Specifically, the legal sales places of the terminal to be identified may be queried based on the IMEI number of the terminal to be identified.

The verification server may be a server of a terminal manufacturer or a seller, or a server capable of connecting to and acquiring sales compliance data of the terminal manufacturer. Specifically, the terminal manufacturer knows the IMEI number of each mobile terminal, and clearly understands and records the MAC address of the WIFI module and the MAC address of the Bluetooth module used to assemble each mobile terminal, and specifies and records permissible (legal) sales places for each terminal. Based on this, the legal sales places of the terminal to be identified can be inquired through the verification server based on the IMEI number of the terminal to be identified.

Step 5. Generate the identification result by comparing the location information with the legal sales places of the terminal to be identified.

In detail, the execution method of step 5 may mainly include followings.

The sales record of the terminal is queried based on the IMEI number of the terminal, and when the sales record of the terminal to be identified is not sold, the legal sales places of the terminal is queried based on the IMEI number of the terminal, and it is determined whether the terminal to be identified is in the legal sales place through the location information of the identifying terminal (that is, whether the location information of the identifying terminal is consistent with the legal sales place of the terminal to be identified, or whether the location information belongs to the legal sales place of the terminal to be identified).

If the terminal to be identified is in the legal sales place (for example, it is determined that the location information is consistent with the legal sales place of the terminal to be identified, or it is determined that the location information belongs to the legal sales place of the terminal to be identified), it is determined that the identification result is the terminal to be identified is not a parallel import terminal, and the identification result is sent to the identifying terminal.

If the terminal to be identified is not in the legal sales place (for example, it is determined that the location information is inconsistent with the legal sales place of the terminal to be identified, or it is determined that the location information does not belong to the legal sales place of the terminal to be identified), it is determined that the identification result is the terminal to be identified is a parallel import terminal, and the identification result is sent to the identifying terminal.

When the sales record of the terminal queried based on the IMEI number of the terminal is sold, the user information of the buyer of the terminal to be identified is determined, the location information of the buyer is determined based on the user information of the buyer, and the location information of the identifying terminal is compared with the location information of the buyer to determine whether they are consistent. When they are consistent, it is determined that the identification result is the terminal to be identified is not a parallel import terminal, and the identification result is sent to the identifying terminal. When they are inconsistent, it is determined that the identification result is the terminal to be identified is a parallel import terminal, and the identification result is sent to the identifying terminal.

In step 105, the identification result sent by the verification server is obtained and outputted.

After obtaining and outputting the identification result sent by the verification server, the method provided by the present disclosure further includes:

sending an erasing instruction and a shutdown instruction to the terminal to be identified, wherein the erasing instruction is configured to restore the terminal to be identified to factory settings.

In conclusion, in the method for identifying terminals proposed in the present disclosure, the NFC card reader of the identifying terminal is used to send a preset instruction to the NFC chip of the terminal to be identified packaged in the packaging box, so as to make the NFC chip pull up the power-on level, to switch on the terminal to be identified in a compartment. Then, the identification information corresponding to the terminal to be identified is obtained. This information at least includes the IMEI number of the terminal to be identified and the information that uniquely indicates the terminal to be identified. Then the location information of the identifying terminal is obtained, and the location information and the identification information of the terminal to be identified are transmitted to the verification server, so that the verification server can query the legal sales places of the terminal to be identified based on the identification information of the terminal to be identified, and generate the identification result by comparing the location information with the legal sales places of the terminal to be identified. Finally, the identification result sent by the verification server is obtained and output.

It can be seen that, in embodiments of the present disclosure, the user can obtain the IMEI number of the terminal to be identified and the information uniquely indicating the terminal to be identified without removing the box, and identify whether the terminal is compliant based on the IMEI number and the information uniquely indicating the terminal to be identified, avoiding the occurrence of "having to purchase after unpacking even if the terminal is noncompliant", improving the user's purchasing experience and protecting the operation of the compliant terminal market.

Moreover, both the IMEI number and the information uniquely indicating the terminal to be identified are obtained in embodiments of the present disclosure. Although the IMEI number may be tampered with in the related art, it is impossible for a person to simultaneously know the information uniquely indicating the terminal to be identified corresponding to the IMEI number, such as the MAC address of the WIFI module and the MAC address of the Bluetooth module corresponding to the IMEI number. Therefore, checking whether the terminal to be identified is compliant based on these correspondences can avoid the inaccurate query caused by tampering with the IMEI number.

In addition, in embodiments of the present disclosure, when verifying the terminal to be identified, verification is also performed based on the location information of the identifying terminal and the number of historical verifications of the terminal to be identified, so that the identification accuracy can be further improved.

Embodiment 2

Figure 2:
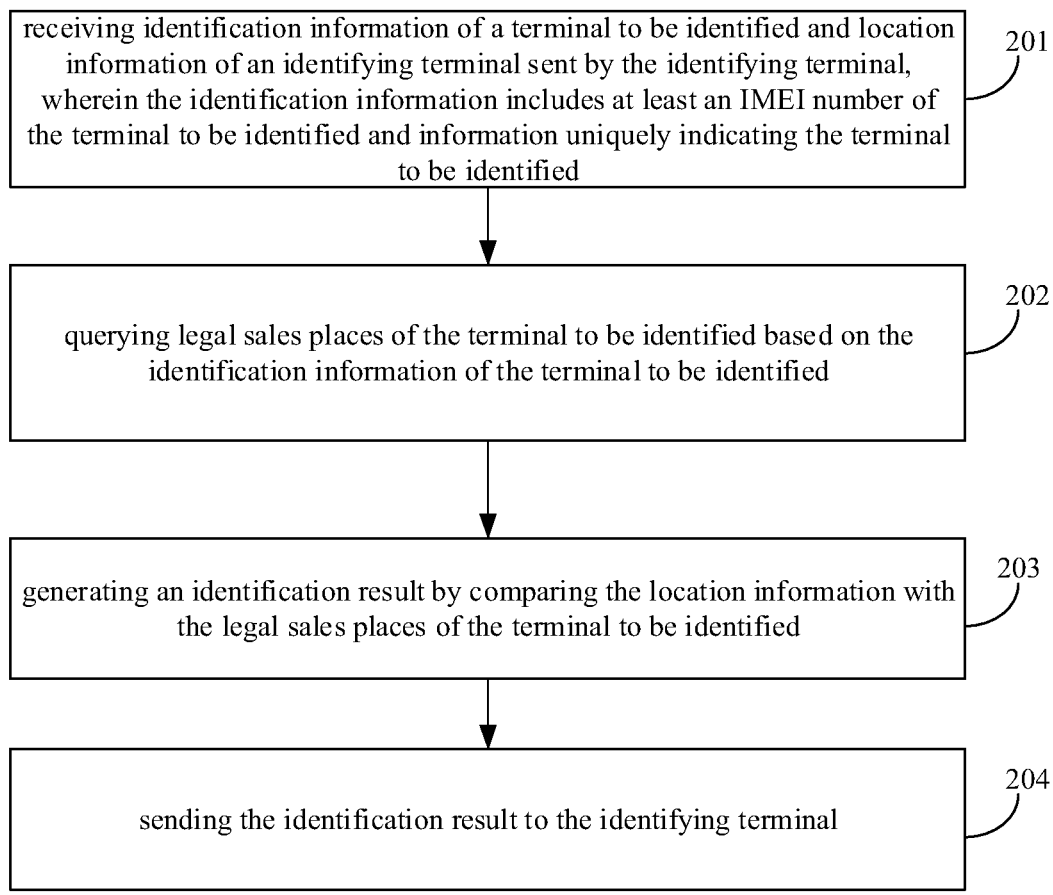
FIG. 2 is a flowchart of a method for identifying terminals provided according to one or more examples of the present disclosure.

FIG. 2 is a flowchart of a method for identifying terminals provided according to an embodiment of the present disclosure. As illustrated in FIG. 2, the method for identifying terminals may include the followings.

In step 201, identification information of a terminal to be identified and location information of an identifying terminal sent by the identifying terminal are received. The identification information includes at least an IMEI number of the terminal to be identified and information uniquely indicating the terminal to be identified.

The information uniquely indicating the terminal to be identified provided in the present disclosure may include at least one of the followings:

a MAC address of a WIFI module of the terminal to be identified;

a MAC address of a Bluetooth module of the terminal to be identified.

In step 202, legal sales places of the terminal to be identified are queried based on the identification information of the terminal to be identified.

The method for querying the legal sales places of the terminal to be identified based on the identification information of the terminal to be identified may include followings.

Step 1, Query the correct MAC address of the WIFI module and/or the correct MAC address of the Bluetooth module corresponding to the terminal to be identified according to the IMEI number of the terminal to be identified.

Step 2, Determine whether the correct MAC address of the WIFI module is consistent with the MAC address of the WIFI module in the identification information reported by the identifying terminal, and/or determine whether the correct MAC address of the Bluetooth module is consistent with the MAC address of the Bluetooth module in the identification information reported by the identifying terminal. When they are both consistent, it is determined that the identification result of the terminal to be identified is a genuine terminal, and step 3 is performed; otherwise, the identification result of the terminal to be identified is a non-genuine terminal, and the identification result is sent to the identifying terminal.

Step 3, Obtain the number of historical verifications of the terminal to be identified, determine whether the number of historical verifications exceeds the threshold, and when the threshold is exceeded, determine that the identification result of the terminal to be identified is a non-genuine terminal, and send the identification result to the identifying terminal. When the threshold is not exceeded, proceed to step 4.

In this step 3, the number of historical verifications of the terminal to be identified may be obtained by determining the number of historical queries of the IMEI number of the terminal to be identified. The threshold value may be 1, for example.

Step 4, Obtain the legal sales places of the terminal to be identified.

In detail, the legal sales places of the terminal to be identified may be queried based on the IMEI number of the terminal to be identified.

The verification server may be a server of a terminal manufacturer or a seller, or a server capable of connecting to and acquiring sales compliance data of the terminal manufacturer. Specifically, the terminal manufacturer knows the IMEI number of each mobile terminal, and clearly understands and records the MAC address of the WIFI module and the MAC address of the Bluetooth module used to assemble each mobile terminal, and specifies and records permissible (legal) sales places for each terminal. Based on this, the legal sales places of the terminal to be identified can be inquired through the verification server based on the IMEI number of the terminal to be identified.

In step 203, an identification result is generated by comparing the location information with the legal sales places of the terminal to be identified.

In detail, the method for generating the identification result by comparing the location information with the legal sales places of the terminal to be identified provided in the present disclosure may include followings.

The sales record of the terminal is queried based on the IMEI number of the terminal, and when the sales record of the terminal to be identified is not sold, the legal sales places of the terminal is queried based on the IMEI number of the terminal, and it is determined whether the terminal to be identified is in the legal sales place through the location information of the identifying terminal (that is, whether the location information of the identifying terminal is consistent with the legal sales place of the terminal to be identified, or whether the location information belongs to the legal sales place of the terminal to be identified).

If the terminal to be identified is in the legal sales place (for example, it is determined that the location information is consistent with the legal sales place of the terminal to be identified, or it is determined that the location information belongs to the legal sales place of the terminal to be identified), it is determined that the identification result is the terminal to be identified is not a parallel import terminal, and the identification result is sent to the identifying terminal.

If the terminal to be identified is not in the legal sales place (for example, it is determined that the location information is inconsistent with the legal sales place of the terminal to be identified, or it is determined that the location information does not belong to the legal sales place of the terminal to be identified), it is determined that the identification result is the terminal to be identified is a parallel import terminal, and the identification result is sent to the identifying terminal.

When the sales record of the terminal queried based on the IMEI number of the terminal is sold, the user information of the buyer of the terminal to be identified is determined, the location information of the buyer is determined based on the user information of the buyer, and the location information of the identifying terminal is compared with the location information of the buyer to determine whether they are consistent. When they are consistent, it is determined that the identification result is the terminal to be identified is not a parallel import terminal, and the identification result is sent to the identifying terminal. When they are inconsistent, it is determined that the identification result is the terminal to be identified is a parallel import terminal, and the identification result is sent to the identifying terminal.

In step 204, the identification result is sent to the identifying terminal.

In conclusion, in the method for identifying terminals proposed in the present disclosure, the NFC card reader of the identifying terminal is used to send a preset instruction to the NFC chip of the terminal to be identified packaged in the packaging box, so as to make the NFC chip pull up the power-on level, to switch on the terminal to be identified in a compartment. Then, the identification information corresponding to the terminal to be identified is obtained. This information at least includes the IMEI number of the terminal to be identified and the information that uniquely indicates the terminal to be identified. Then the location information of the identifying terminal is obtained, and the location information and the identification information of the terminal to be identified are transmitted to the verification server, so that the verification server can query the legal sales places of the terminal to be identified based on the identification information of the terminal to be identified, and generate the identification result by comparing the location information with the legal sales places of the terminal to be identified. Finally, the identification result sent by the verification server is obtained and output.

It can be seen that, in embodiments of the present disclosure, the user can obtain the IMEI number of the terminal to be identified and the information uniquely indicating the terminal to be identified without removing the box, and identify whether the terminal is compliant based on the IMEI number and the information uniquely indicating the terminal to be identified, avoiding the occurrence of "having to purchase after unpacking even if the terminal is noncompliant", improving the user's purchasing experience and protecting the operation of the compliant terminal market.

Moreover, both the IMEI number and the information uniquely indicating the terminal to be identified are obtained in embodiments of the present disclosure. Although the IMEI number may be tampered with in the related art, it is impossible for a person to simultaneously know the information uniquely indicating the terminal to be identified corresponding to the IMEI number, such as the MAC address of the WIFI module and the MAC address of the Bluetooth module corresponding to the IMEI number.

Therefore, checking whether the terminal to be identified is compliant based on these correspondences can avoid the inaccurate query caused by tampering with the IMEI number.

In addition, in embodiments of the present disclosure, when verifying the terminal to be identified, verification is also performed based on the location information of the identifying terminal and the number of historical verifications of the terminal to be identified, so that the identification accuracy can be further improved.

Embodiment 3

Figure 3:
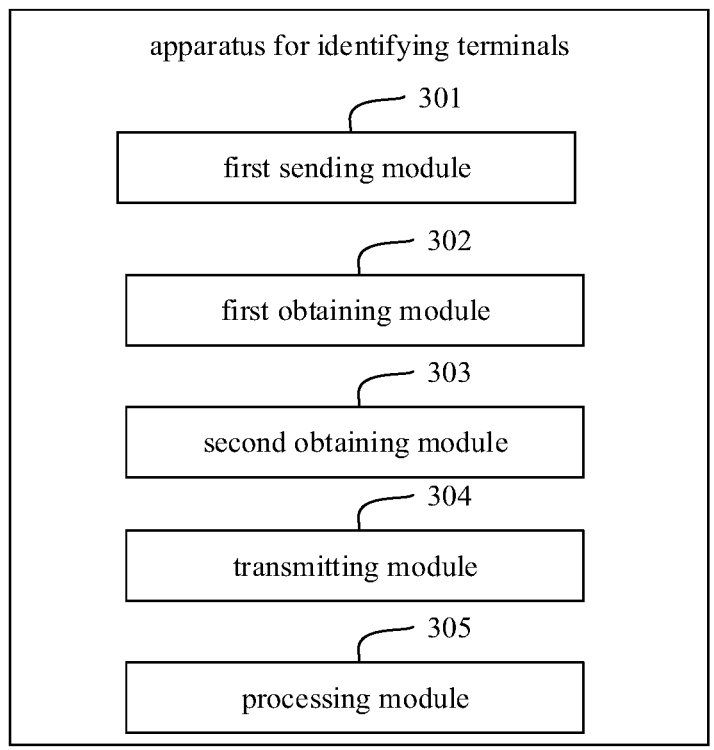
FIG. 3 is a block diagram of an apparatus for identifying terminals provided according to one or more examples of the present disclosure.

FIG. 3 is a block diagram of an apparatus for identifying terminals provided according to an embodiment of the present disclosure. As illustrated in FIG. 3, the apparatus for identifying terminals includes a first sending module 301, a first obtaining module 302, a second obtaining module 303, a transmitting module 304 and a processing module 305.

The first sending module 301 is configured to send by an NFC card reader of an identifying terminal, a preset instruction to an NFC chip of a terminal to be identified packaged in a packaging box. The preset instruction is configured to enable the NFC chip to pull up a power-on level, to switch on the terminal to be identified in a compartment.

The first obtaining module 302 is configured to obtain identification information corresponding to the terminal to be identified. The identification information at least comprises an IMEI number of the terminal to be identified and information uniquely indicating the terminal to be identified.

The second obtaining module 303 is configured to obtain location information of the identifying terminal.

The transmitting module 304 is configured to transmit the location information and the identification information of the terminal to be identified to a verification server, so that the verification server query legal sales places of the terminal to be identified based on the identification information of the terminal to be identified, and generate an identification result by comparing the location information with the legal sales places of the terminal to be identified.

The processing module 305 is configured to obtain and output the identification result sent by the verification server.

In conclusion, in the apparatus for identifying terminals proposed in the present disclosure, the NFC card reader of the identifying terminal is used to send a preset instruction to the NFC chip of the terminal to be identified packaged in the packaging box, so as to make the NFC chip pull up the power-on level, to switch on the terminal to be identified in a compartment. Then, the identification information corresponding to the terminal to be identified is obtained. This information at least includes the IMEI number of the terminal to be identified and the information that uniquely indicates the terminal to be identified. Then the location information of the identifying terminal is obtained, and the location information and the identification information of the terminal to be identified are transmitted to the verification server, so that the verification server can query the legal sales places of the terminal to be identified based on the identification information of the terminal to be identified, and generate the identification result by comparing the location information with the legal sales places of the terminal to be identified. Finally, the identification result sent by the verification server is obtained and output.

It can be seen that, in embodiments of the present disclosure, the user can obtain the IMEI number of the terminal to be identified and the information uniquely indicating the terminal to be identified without removing the box, and identify whether the terminal is compliant based on the IMEI number and the information uniquely indicating the terminal to be identified, avoiding the occurrence of "having to purchase after unpacking even if the terminal is noncompliant", improving the user's purchasing experience and protecting the operation of the compliant terminal market.

Moreover, both the IMEI number and the information uniquely indicating the terminal to be identified are obtained in embodiments of the present disclosure. Although the IMEI number may be tampered with in the related art, it is impossible for a person to simultaneously know the information uniquely indicating the terminal to be identified corresponding to the IMEI number, such as the MAC address of the WIFI module and the MAC address of the Bluetooth module corresponding to the IMEI number. Therefore, checking whether the terminal to be identified is compliant based on these correspondences can avoid the inaccurate query caused by tampering with the IMEI number.

In addition, in embodiments of the present disclosure, when verifying the terminal to be identified, verification is also performed based on the location information of the identifying terminal and the number of historical verifications of the terminal to be identified, so that the identification accuracy can be further improved.

Optionally, the information uniquely indicating the terminal to be identified includes at least one of the followings:

a MAC address of a WIFI module of the terminal to be identified;

a MAC address of a Bluetooth module of the terminal to be identified.

The transmitting module 304 is further configured to:

encrypt the location information and the identification information;

transmit the encrypted location information and identification information to the verification server.

The processing module 305 is further configured to:

send an erasing instruction and a shutdown instruction to the terminal to be identified, wherein the erasing instruction is configured to restore the terminal to be identified to factory settings.

The apparatus is further configured to:

obtain a power of the terminal to be identified, and determine whether the power meets a preset power;

in response to the power meeting the preset power, perform the step of obtaining the identification information corresponding to the terminal to be identified;

in response to the power not meeting the preset power, output a prompt of insufficient power.

Embodiment 4

Figure 4:
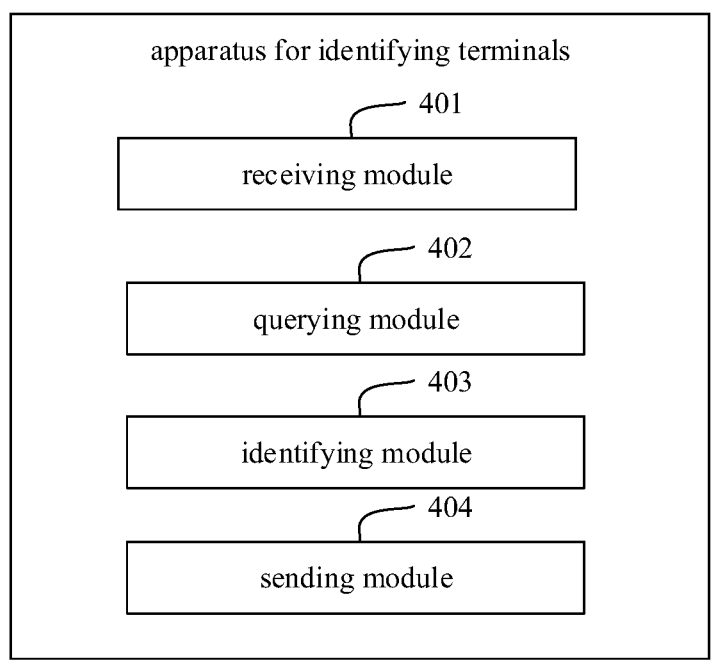
FIG. 4 is a block diagram of an apparatus for identifying terminals provided according to one or more examples of the present disclosure.

FIG. 4 is a block diagram of an apparatus for identifying terminals provided according to an embodiment of the present disclosure. As illustrated in FIG. 4, the apparatus for identifying terminal includes a receiving module 401, a querying module 402, an identifying module 403 and a sending module 404.

The receiving module 401 is configured to receive identification information of a terminal to be identified and location information of an identifying terminal sent by the identifying terminal. The identification information includes at least an IMEI number of the terminal to be identified and information uniquely indicating the terminal to be identified The querying module 402 is configured to query legal sales places of the terminal to be identified based on the identification information of the terminal to be identified.

The identifying module 403 is configured to generate an identification result by comparing the location information with the legal sales places of the terminal to be identified.

The sending module 404 is configured to send the identification result to the identifying terminal.

In conclusion, in the apparatus for identifying terminals proposed in the present disclosure, the NFC card reader of the identifying terminal is used to send a preset instruction to the NFC chip of the terminal to be identified packaged in the packaging box, so as to make the NFC chip pull up the power-on level, to switch on the terminal to be identified in a compartment. Then, the identification information corresponding to the terminal to be identified is obtained. This information at least includes the IMEI number of the terminal to be identified and the information that uniquely indicates the terminal to be identified. Then the location information of the identifying terminal is obtained, and the location information and the identification information of the terminal to be identified are transmitted to the verification server, so that the verification server can query the legal sales places of the terminal to be identified based on the identification information of the terminal to be identified, and generate the identification result by comparing the location information with the legal sales places of the terminal to be identified. Finally, the identification result sent by the verification server is obtained and output.

It can be seen that, in embodiments of the present disclosure, the user can obtain the IMEI number of the terminal to be identified and the information uniquely indicating the terminal to be identified without removing the box, and identify whether the terminal is compliant based on the IMEI number and the information uniquely indicating the terminal to be identified, avoiding the occurrence of "having to purchase after unpacking even if the terminal is noncompliant", improving the user's purchasing experience and protecting the operation of the compliant terminal market.

Moreover, both the IMEI number and the information uniquely indicating the terminal to be identified are obtained in embodiments of the present disclosure. Although the IMEI number may be tampered with in the related art, it is impossible for a person to simultaneously know the information uniquely indicating the terminal to be identified corresponding to the IMEI number, such as the MAC address of the WIFI module and the MAC address of the Bluetooth module corresponding to the IMEI number. Therefore, checking whether the terminal to be identified is compliant based on these correspondences can avoid the inaccurate query caused by tampering with the IMEI number.

In addition, in embodiments of the present disclosure, when verifying the terminal to be identified, verification is also performed based on the location information of the identifying terminal and the number of historical verifications of the terminal to be identified, so that the identification accuracy can be further improved.

The information uniquely indicating the terminal to be identified includes at least one of the followings:

a MAC address of a WIFI module of the terminal to be identified;

a MAC address of a Bluetooth module of the terminal to be identified.

The querying module 402 is further configured to:

query a correct MAC address of the WIFI module and/or a correct MAC address of the Bluetooth module corresponding to the terminal to be identified according to the IMEI number of the terminal to be identified;

determine whether the correct MAC address of the WIFI module and/or the correct MAC address of the Bluetooth module is consistent with the MAC address of the WIFI module and/or the MAC address of the Bluetooth module in the identification information reported by the identifying terminal;

in response to being consistent, obtain the legal sales places of the terminal to be identified;

in response to being inconsistent, determine that the identification result of the terminal to be identified is a non-genuine terminal.

Optionally, the apparatus is further configured to:

obtain a number of historical verifications of the terminal to be identified, and determine whether the number of historical verifications exceeds a threshold.

The identifying module 403 is further configured to:

determine whether the terminal to be identified is in the legal sales place according to the location information;

in response to the terminal to be identified being in the legal sales place, determine that the identification result is the terminal to be identified is not a parallel import terminal;

in response to the terminal to be identified being not in the legal sales place, determine that the identification result is the terminal to be identified is a parallel import terminal.

In order to achieve above embodiments, the present disclosure further provided a computer storage medium.

The computer storage medium provided by embodiments of the present disclosure is stored with an executable program. When the executable program is executed by the processor, the method as shown in any one of FIG. 1 or FIG. 2 can be implemented.

Figure 5:
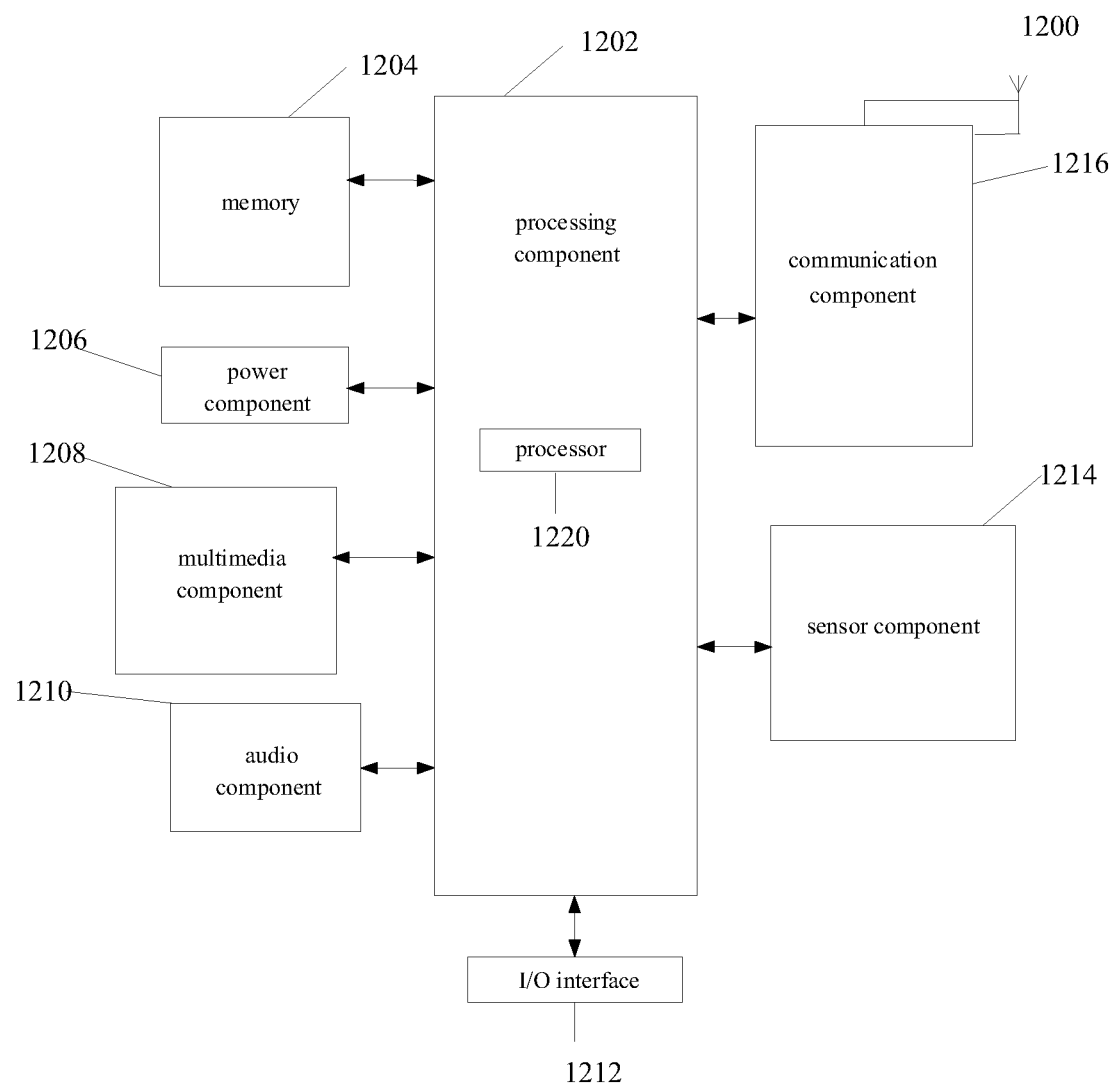
FIG. 5 is a block diagram of an identifying terminal provided according to one or more examples of the present disclosure.

FIG. 5 is a block diagram illustrating an identifying terminal according to an exemplary embodiment of the present disclosure. For example, the identifying terminal 1200 may be a mobile phone, a computer, a digital broadcasting terminal, a messaging device, a game console, a tablet device, a medical device, fitness equipment, a Personal Digital Assistant PDA, and the like.

Referring to FIG. 5, the identifying terminal 1200 may include the following one or more components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the identifying terminal 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the identifying terminal 1200. Examples of such data include instructions for any applications or methods operated on the identifying terminal 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the identifying terminal 1200. The power component 1206 may include a power management system, one or more power sources, and any other components associated with the generation, management, and distribution of power in the identifying terminal 1200.

The multimedia component 1208 includes a screen providing an output interface between the identifying terminal 1200 and the user. In some embodiments, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 1208 includes a front camera and/or a rear camera. The front camera and/or the rear camera may receive external multimedia data while the identifying terminal 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the mobile terminal 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface for the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the identifying terminal 1200. For instance, the sensor component 1214 may detect an open/closed status of the identifying terminal 1200 and relative positioning of components (e.g. the display and the keypad of the identifying terminal 1200. The sensor component 514 may also detect a change in position of the mobile terminal 1200 or of a component in the identifying terminal 1200, a presence or absence of user contact with the identifying terminal 1200, an orientation or an acceleration/deceleration of the identifying terminal 1200, and a change in temperature of the identifying terminal 1200. The sensor component 1214 may include a proximity sensor configured to detect the presence of nearby objects without any physical contact. The sensor component 1214 may also include an illumination sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate wired or wireless communication between the identifying terminal 1200 and other devices. The identifying terminal 1200 can access a wireless network based on a communication standard, such as WIFI, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the identifying terminal 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 1204 including instructions. The instructions may be performed by the processor 1220 of the identifying terminal 1200 so as to realize the method for identifying terminals. For example, the non-transitory computer-readable storage medium may be a ROM, a RAM, a CD-ROM, a magnetic tape, a floppy disc, an optical data storage device, and the like.

Figure 6:
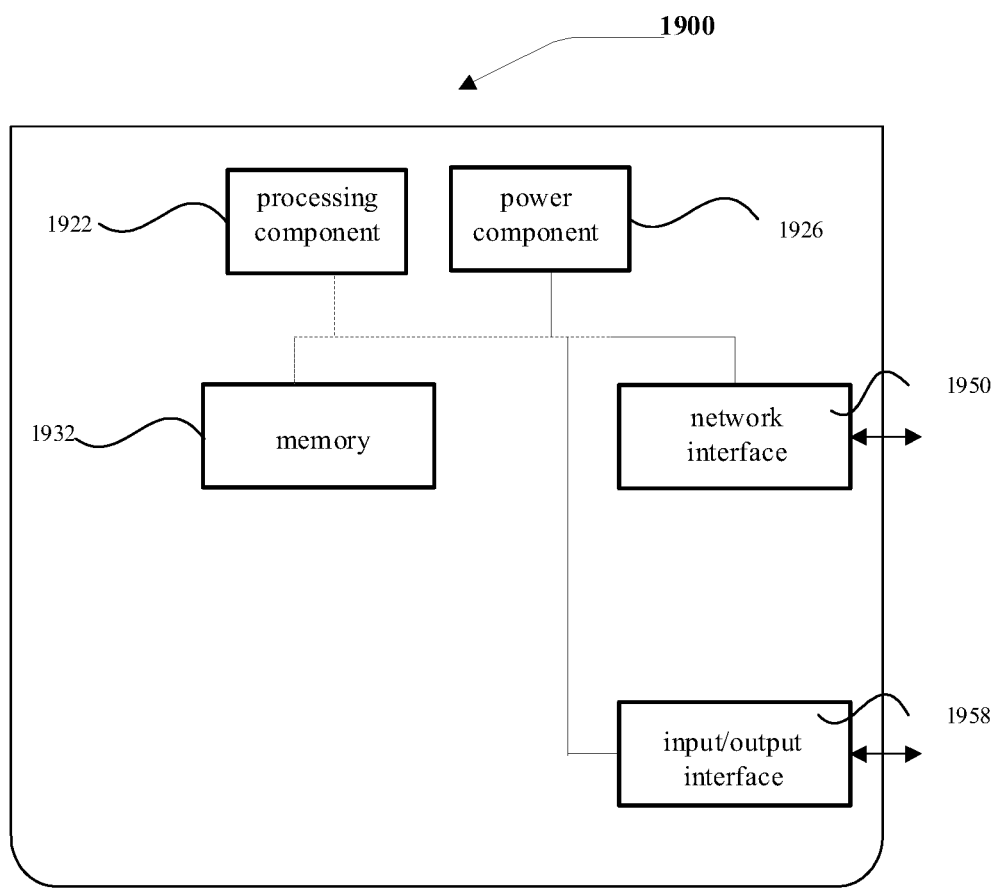
FIG. 6 is a block diagram of a verification server provided according to one or more examples of the present disclosure.

FIG. 6 is a block diagram illustrating a verification server according to an example embodiment. Referring to the FIG. 6, the verification server 1900 includes a processing component 1922, which further includes one or more processors, and memory resources represented by the memory 1932 for storing instructions executable by the processing component 1922, such as application programs. The applications stored in the memory 1932 may include one or more modules, in which each corresponds to a set of instructions. In addition, the processing component 1922 is configured to execute instructions to implement the above method for identifying terminals. The verification server 1900 may further include a power component 1926 configured to perform power management of the server 1900, a wired or wireless network interface 1950 configured to connect the server 1900 to the network, and an input/output (I/O) interface 1958. The server 1900 can operate based on an operating system stored in the memory 1932, such as WindowsServer™, MacOSX™, Unix™, Linux™, FreeBSD™.

In an exemplary embodiment, there is also provided a non-transitory computer-readable storage medium including instructions, such as the memory 1932 including instructions, which can be executed by the processing component 1922 of the server 1900 to complete the above method. For example, the non-transitory computer-readable storage medium may be a ROM, a Random Access Memory (RAM), a CD-ROM, a magnetic tape, a floppy disk, an optical data storage device, etc.

In the description of this specification, description with reference to the terms "one embodiment," "some embodiments," "example," "specific example," or "some examples", etc., mean specific features, structures, materials, or characteristics described in connection with the embodiment or example, are included in at least one embodiment or example of the present disclosure. In this specification, schematic representations of the above terms are not necessarily directed to the same embodiment or example. Furthermore, the particular features, structures, materials or characteristics described may be combined in any suitable manner in any one or more embodiments or examples. Furthermore, those skilled in the art may combine and merge the different embodiments or examples described in this specification, as well as the features of the different embodiments or examples, without conflicting each other.

The description of any process or method in the flowcharts or otherwise described herein may be understood to represent a module, segment or portion of code comprising one or more executable instructions for implementing custom logical functions or steps of the process, and the scope of the preferred embodiments of the present disclosure includes alternative implementations in which the functions may be performed out of the order shown or discussed, including performing the functions substantially concurrently or in the reverse order depending upon the functions involved, which should be understood by those skilled in the art to which the embodiments of the present disclosure pertain.

Although the embodiments of the present disclosure have been shown and described above, it should be understood that the above-mentioned embodiments are exemplary and should not be construed as limiting the present disclosure. Changes, modifications, substitutions and alterations to the above-described embodiments may be made by those of ordinary skill in the art within the scope of the present disclosure.

What is claimed is:

1. A method for identifying terminals, comprising:
    sending, by a near field communication (NFC) card reader of an identifying terminal, a preset instruction to an NFC chip of a terminal to be identified packaged in a packaging box, wherein the preset instruction is configured to enable the NFC chip to pull up a power-on level, to switch on the terminal to be identified in a compartment;
    obtaining, by the identifying terminal, identification information corresponding to the terminal to be identified, wherein the identification information comprises at least an International Mobile Equipment Identity (IMEI) number of the terminal to be identified and information uniquely indicating the terminal to be identified;
    obtaining location information of the identifying terminal;
    transmitting the location information and the identification information of the terminal to be identified to a verification server, wherein the verification server queries legal sales places of the terminal to be identified based on the identification information of the terminal to be identified, and generates an identification result by comparing the location information with the legal sales places of the terminal to be identified; and
    obtaining and outputting the identification result sent by the verification server.

2. The method of claim 1, wherein the information uniquely indicating the terminal to be identified comprises at least one of:
    a MAC address of a WIFI module of the terminal to be identified; or
    a MAC address of a Bluetooth module of the terminal to be identified.

3. The method of claim 1, wherein transmitting the location information and the identification information of the terminal to be identified to the verification server comprises:
  encrypting the location information and the identification information; and
  transmitting encrypted location information and identification information to the verification server.

4. The method of claim 1, wherein after obtaining and outputting the identification result sent by the verification server, the method further comprises:
  sending an erasing instruction and a shutdown instruction to the terminal to be identified, wherein the erasing instruction is configured to restore the terminal to be identified to factory settings.

5. The method of claim 1, wherein after switching on the terminal to be identified in the compartment, the method further comprises:
  obtaining a power of the terminal to be identified, and determining whether the power meets a preset power;
  in response to the power meeting the preset power, obtaining the identification information corresponding to the terminal to be identified; and
  in response to the power not meeting the preset power, outputting a prompt of insufficient power.

6. A method for identifying terminals, comprising:
  receiving, by a verification server, identification information of a terminal to be identified and location information of an identifying terminal sent by the identifying terminal, wherein the identification information comprises at least an IMEI number of the terminal to be identified and information uniquely indicating the terminal to be identified;
  querying, by the verification server, legal sales places of the terminal to be identified based on the identification information of the terminal to be identified;
  generating an identification result by comparing the location information with the legal sales places of the terminal to be identified; and
  sending the identification result to the identifying terminal.

7. The method of claim 6, wherein the information uniquely indicating the terminal to be identified comprises at least one of:
  a MAC address of a WIFI module of the terminal to be identified; or
  a MAC address of a Bluetooth module of the terminal to be identified.

8. The method of claim 7, wherein querying the legal sales places of the terminal to be identified based on the identification information of the terminal to be identified comprises:
  querying a correct MAC address of the WIFI module or a correct MAC address of the Bluetooth module corresponding to the terminal to be identified according to the IMEI number of the terminal to be identified;
  determining whether the correct MAC address of the WIFI module and/or the correct MAC address of the Bluetooth module is consistent with the MAC address of the WIFI module and/or the MAC address of the Bluetooth module in the identification information reported by the identifying terminal;
  in response to being consistent, obtaining the legal sales places of the terminal to be identified; and
  in response to being inconsistent, determining that the identification result of the terminal to be identified is a non-genuine terminal.

9. The method of claim 8, wherein before obtaining the legal sales places of the terminal to be identified, the method further comprises: obtaining a number of historical verifications of the terminal to be identified, and determining whether the number of historical verifications exceeds a threshold.

10. The method of claim 8, wherein generating the identification result by comparing the location information with the legal sales places of the terminal to be identified comprises:
  determining whether the terminal to be identified is in the legal sales place according to the location information;
  in response to the terminal to be identified being in the legal sales place, determining that the identification result is the terminal to be identified is not a parallel import terminal; and
  in response to the terminal to be identified being not in the legal sales place, determining that the identification result is the terminal to be identified is a parallel import terminal.

11. An identifying terminal, comprising:
  a processor; and
  a memory, configured to store instructions executable by the processor,
  wherein the processor is configured to:
  send, by a near field communication (NFC) card reader of the identifying terminal, a preset instruction to an NFC chip of a terminal to be identified packaged in a packaging box, wherein the preset instruction is configured to enable the NFC chip to pull up a power-on level, to switch on the terminal to be identified in a compartment;
  obtain identification information corresponding to the terminal to be identified, wherein the identification information comprises at least an International Mobile Equipment Identity (IMEI) number of the terminal to be identified and information uniquely indicating the terminal to be identified;
  obtain location information of the identifying terminal;
  transmit the location information and the identification information of the terminal to be identified to a verification server, wherein the verification server queries legal sales places of the terminal to be identified based on the identification information of the terminal to be identified, and generates an identification result by comparing the location information with the legal sales places of the terminal to be identified; and
  obtain and output the identification result sent by the verification server.

12. The identifying terminal of claim 11, wherein the information uniquely indicating the terminal to be identified comprises at least one of:
  a MAC address of a WIFI module of the terminal to be identified; or
  a MAC address of a Bluetooth module of the terminal to be identified.

13. The identifying terminal of claim 11, wherein the processor is further configured to:
  encrypt the location information and the identification information; and
  transmit encrypted location information and identification information to the verification server.

14. The identifying terminal of claim 11, wherein after obtaining and outputting the identification result sent by the verification server, the processor is further configured to:
  send an erasing instruction and a shutdown instruction to the terminal to be identified, wherein the erasing instruction is configured to restore the terminal to be identified to factory settings.

15. The identifying terminal of claim 11, wherein after switching on the terminal to be identified in a compartment, the processor is further configured to:
   obtain a power of the terminal to be identified, and determining whether the power meets a preset power;
   in response to the power meeting the preset power, obtain the identification information corresponding to the terminal to be identified; and
   in response to the power not meeting the preset power, output a prompt of insufficient power.

16. A verification server, comprising:
   a processor; and
   a memory, configured to store instructions executable by the processor,
   wherein the processor is configured to implement the method of claim 6 by executing the instructions stored in the memory.

* * * * *